United States Patent [19]

Iba

[11] Patent Number: 5,499,138
[45] Date of Patent: Mar. 12, 1996

[54] IMAGE DISPLAY APPARATUS

[75] Inventor: Yoichi Iba, Tokyo, Japan

[73] Assignee: Olympus Optical Co., Ltd., Tokyo, Japan

[21] Appl. No.: 67,144

[22] Filed: May 26, 1993

[30] Foreign Application Priority Data

May 26, 1992 [JP] Japan .................................. 4-133856
Jul. 27, 1992 [JP] Japan .................................. 4-199486

[51] Int. Cl.⁶ .................................................. G02B 5/18
[52] U.S. Cl. .............................. 359/569; 359/40; 359/48; 359/619; 345/8; 351/158
[58] Field of Search ............................... 359/40, 41, 565, 359/566, 619, 620, 621, 622, 623, 454, 455, 456, 457, 569, 48; 351/158, 46, 159, 167, 172; 345/82, 8

[56] References Cited

U.S. PATENT DOCUMENTS

| | | | |
|---|---|---|---|
| 3,545,854 | 12/1970 | Olsson ..................................... | 359/565 |
| 3,547,546 | 12/1970 | Schier ..................................... | 359/565 |
| 4,539,482 | 9/1985 | Nose ....................................... | 359/565 |
| 4,994,664 | 2/1991 | Veldkamp ............................... | 359/565 |
| 5,052,783 | 10/1991 | Hamada .................................. | 359/40 |
| 5,106,179 | 4/1992 | Kamaya et al. ........................ | 351/158 |
| 5,119,235 | 6/1992 | Umeda et al. .......................... | 359/619 |
| 5,129,716 | 7/1992 | Holakovszky et al. ................ | 351/158 |
| 5,270,859 | 12/1993 | Wirth et al. ............................. | 359/622 |
| 5,276,471 | 1/1994 | Yamauchi et al. ..................... | 345/8 |
| 5,319,496 | 6/1994 | Jewell et al. ........................... | 359/619 |
| 5,359,440 | 10/1994 | Hamada et al. ........................ | 359/41 |
| 5,359,675 | 10/1994 | Siwoff ..................................... | 345/8 |
| 5,371,556 | 12/1994 | Suwa et al. ............................. | 351/158 |
| 5,379,140 | 1/1995 | Michel et al. .......................... | 351/158 |

FOREIGN PATENT DOCUMENTS

| | | | |
|---|---|---|---|
| 0425266 | 5/1991 | European Pat. Off. ................. | 359/41 |
| 0425251 | 5/1991 | European Pat. Off. ................. | 359/40 |
| 0440495 | 8/1991 | European Pat. Off. ............... | 359/619 |
| 0597477 | 5/1994 | European Pat. Off. .................... | 345/8 |
| 075513 | 4/1987 | Japan ........................................ | 359/40 |
| 3214872 | 9/1991 | Japan ............................... | G09F 9/00 |
| 3-267918 | 11/1991 | Japan ........................................ | 359/41 |
| 5-34677 | 2/1993 | Japan ........................................ | 359/40 |

Primary Examiner—Paul M. Dzierzynski
Assistant Examiner—John Juba, Jr.
Attorney, Agent, or Firm—Cushman, Darby & Cushman

[57] ABSTRACT

An image display apparatus, for example, a spectacle-type image display apparatus, which is capable of reproducing a high-definition image by projecting pixels at a proper pitch on the retina in the user's eye. The image display apparatus includes a microlens array (3) having microlenses provided to correspond respectively to the pixels to converge beams of light emerging from the pixels, and a condenser lens (4) for converting beams of light emerging from the microlens array (3) into parallel beams of light and for leading them to the user's eyeball (7). Thus, a beam of light emerging from each pixel enters the microlens array (3), and the beam of light emerging from the microlens array (3) enters the condenser lens (4) where it is converted into a parallel beam of light, which is then led to the eyeball (7). Since an array of pixels is reconstructed at a proper pitch on the retina (6) in the eyeball (7), the user can perceive an image. In addition, since each pixel and the retina in the eyeball are in conjugate relation to each other, the image of each pixel is clearly formed on the retina. Accordingly, an image that is composed of such pixel images is also clear. Thus, the user can perceive a high-definition image. A Fresnel zone plate array may be used in place of the microlens array (3).

11 Claims, 13 Drawing Sheets

A

B

C

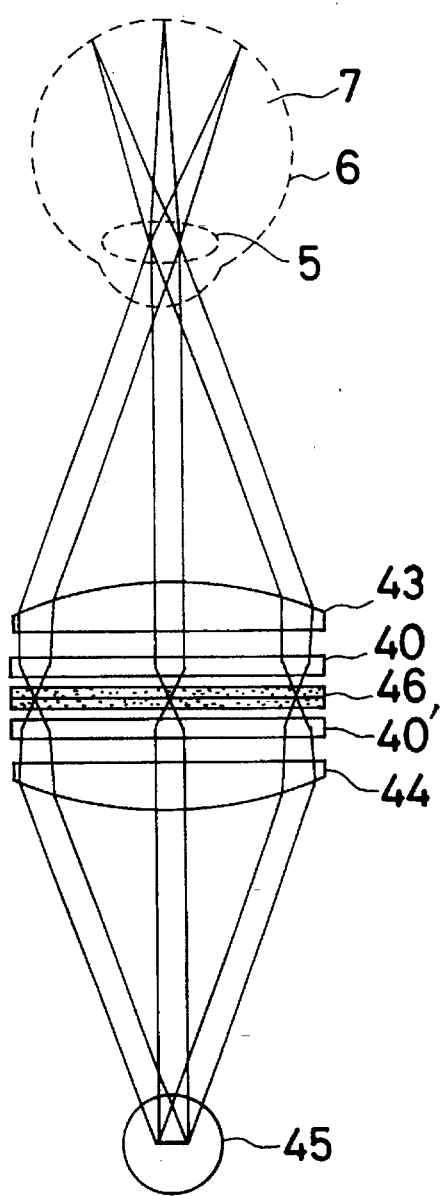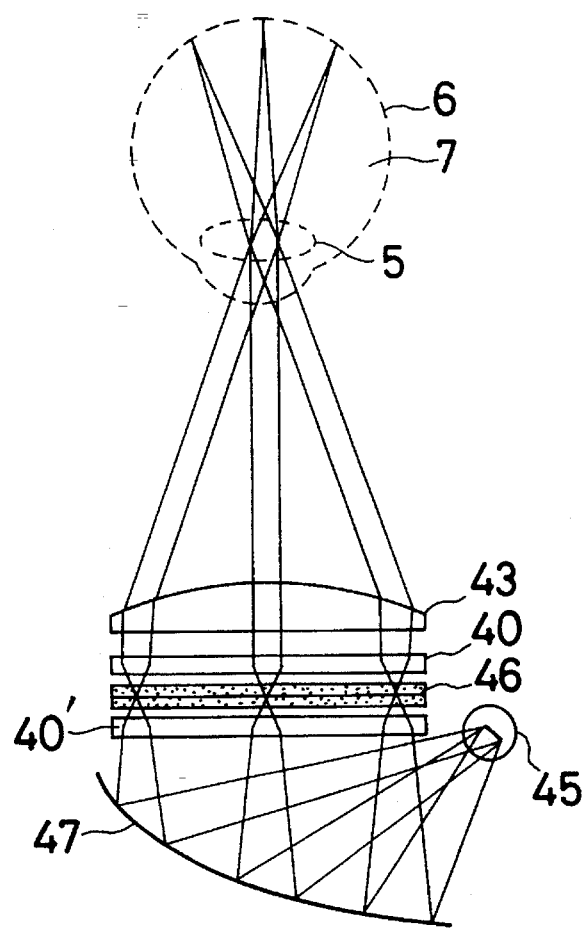

IMAGE DISPLAY APPARATUS

BACKGROUND OF THE INVENTION

The present invention relates to an image display apparatus and, more particularly, to a spectacle-type image display apparatus which is designed to project an image directly on the retinas in both the user's eyes.

Most image information is generally projected on a monitor, a screen, etc. However, spectacle-type image display apparatuses have also already been proposed. One such display apparatus is disclosed in Japanese Patent Application Laid-Open (KOKAI) No. 3-214872 (1991). In the disclosed display apparatus, an image of a transmissive image plate, which is illuminated by a point source, is focused on an eyeball by an ocular lens, thereby enabling the user to view the image formed directly on the retina.

The prior art will be explained below with reference to FIG. 17. As shown in the figure, the prior art image display apparatus comprises a point source 111, an image plate 112 illuminated by the point source 111, and a short-focus ocular lens 113 disposed substantially integral with the image plate 112. A beam of light converges to a focus on a pupil 117 lying in front of a crystalline lens 116 in an eyeball 114, and an image is formed on a retina 115 through a pinhole defined by the point of focus. With this arrangement, the frames of the spectacles can be made compact advantageously.

In the above-described prior art, a transmissive liquid crystal plate with a color filter is employed as the image plate 112. However, since the image plate 112 is not in conjugate relation to the retina 115, it is necessary in order to obtain a high-definition image to reduce the diameter of the pinhole formed on the pupil 117 from the viewpoint of geometrical optics. However, if the diameter of the pinhole is made excessively small, the projected image becomes unsharp due to the diffraction of light. Consequently, the above-described prior art cannot provide a high-definition image.

SUMMARY OF THE INVENTION

In view of these circumstances, it is an object of the present invention to solve the above-described problems and to provide an image display apparatus, for example, a spectacle-type image display apparatus, which is capable of reproducing a high-definition image by projecting pixels at a proper pitch on the retina in the user's eye.

It is another object of the present invention to provide an image display apparatus, e.g., a spectacle-type image display apparatus, which is designed so that even if the number of pixels of an image display device is increased, there is no lowering in the resolution due to diffraction, but a high resolution is obtained correspondingly to the number of pixels.

To attain the above-described objects, the present invention provides an image display apparatus including image display means having a plurality of two-dimensionally disposed pixels, and optical means for converting a beam of light emerging from each of the pixels into an approximately parallel beam of light and for refracting each light beam toward an observer's eye.

Preferably, the optical means includes first optical means for converging a beam of light emerging from each of the pixels, and second optical means for converting a beam of light emerging from the first optical means into an approximately parallel beam of light and then refracting the light beam toward the observer's eye. The arrangement may be such that the first optical means is a microlens array having a plurality of microlenses formed to correspond respectively to the pixels of the image display means, and the second optical means is a positive lens. The arrangement may also be such that the first optical means is a microlens array having a plurality of microlenses formed to correspond respectively to the pixels of the image display means, and the array pitch of the microlenses is approximately equal to the array pitch of the pixels.

Further, the arrangement may be such that the optical means is a microlens array having a plurality of microlenses formed to correspond respectively to the pixels of the image display means, and the optical axes of the microlenses are eccentric with respect to the corresponding pixels at the peripheral part of the image display means. Alternatively, the array pitch of the microlenses may be made smaller than the array pitch of the pixels.

When the optical means comprises the first and second optical means, the first optical means may be a diffraction optical element array having a plurality of diffraction optical elements formed to correspond respectively to the pixels of the image display means. The diffraction optical elements are each disposed to overlap at least one of diffraction optical elements adjacent thereto. In this case, a light-beam limiting means having apertures formed to correspond respectively to the pixels may be disposed in between the image display means and the diffraction optical element array, and the image display means, the light-beam limiting means and the diffraction optical element array may be disposed so that zero-order light transmitted by the diffraction optical element array does not enter the observer's eye. It should be noted that the diffraction optical elements are preferably Fresnel zone plates.

Further, the arrangement may be such that the optical means is a diffraction optical element array having a plurality of diffraction optical elements formed to correspond respectively to the pixels of the image display means, and the diffraction optical elements are each disposed to overlap at least one of diffraction optical elements adjacent thereto.

When a diffraction optical element array having a plurality of diffraction optical elements is used, it may comprise two diffraction grating element surfaces each comprising an array of a plurality of minute diffraction optical elements.

Further, the image display means may comprise a transmissive flat display panel having a plurality of pixels, a second microlens array having a plurality of microlenses formed to correspond respectively to the pixels, a condenser lens, and light source means having a minute light-emitting part, so that a beam of light emitted from the light source means is converged on each pixel of the transmissive display panel by the condenser lens and the second microlens array. In this case, the light source means may comprise a surface illuminant, and a pinhole for passing a beam of light from the surface illuminant.

In the present invention, the image display apparatus includes image display means having a plurality of two-dimensionally disposed pixels, and optical means for converting a beam of light emerging from each pixel into an approximately parallel beam of light and for refracting each light beam toward the observer's eye. Therefore, a beam of light emerging from each pixel is converted into a parallel beam of light and led to the eyeball. Since an array of pixels is reconstructed at a proper pitch on the retina in the eyeball, the observer can perceive an image. Further, since each pixel and the retina in the eyeball are in conjugate relation to each other, the image of each pixel is clearly formed on the retina. Accordingly, an image that is composed of such pixel images is also clear. Thus, the observer can perceive a high-definition image.

If a diffraction optical element array is used as at least a part of the above-described optical means, since the diffraction optical elements can be disposed to overlap each other, it is unnecessary to reduce the effective aperture of each diffraction optical element even if the pixel pitch is reduced. Accordingly, the pixel image becomes even more clear, and a higher resolution can be obtained.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 11(a) and 11(b) are an optical path diagram showing the whole optical system of a fifth embodiment of the image display apparatus according to the present invention.

DESCRIPTION OF THE PREFERRED EMBODIMENTS

Some embodiments of the image display apparatus according to the present invention will be described below with reference to the accompanying drawings.

Figure 1:
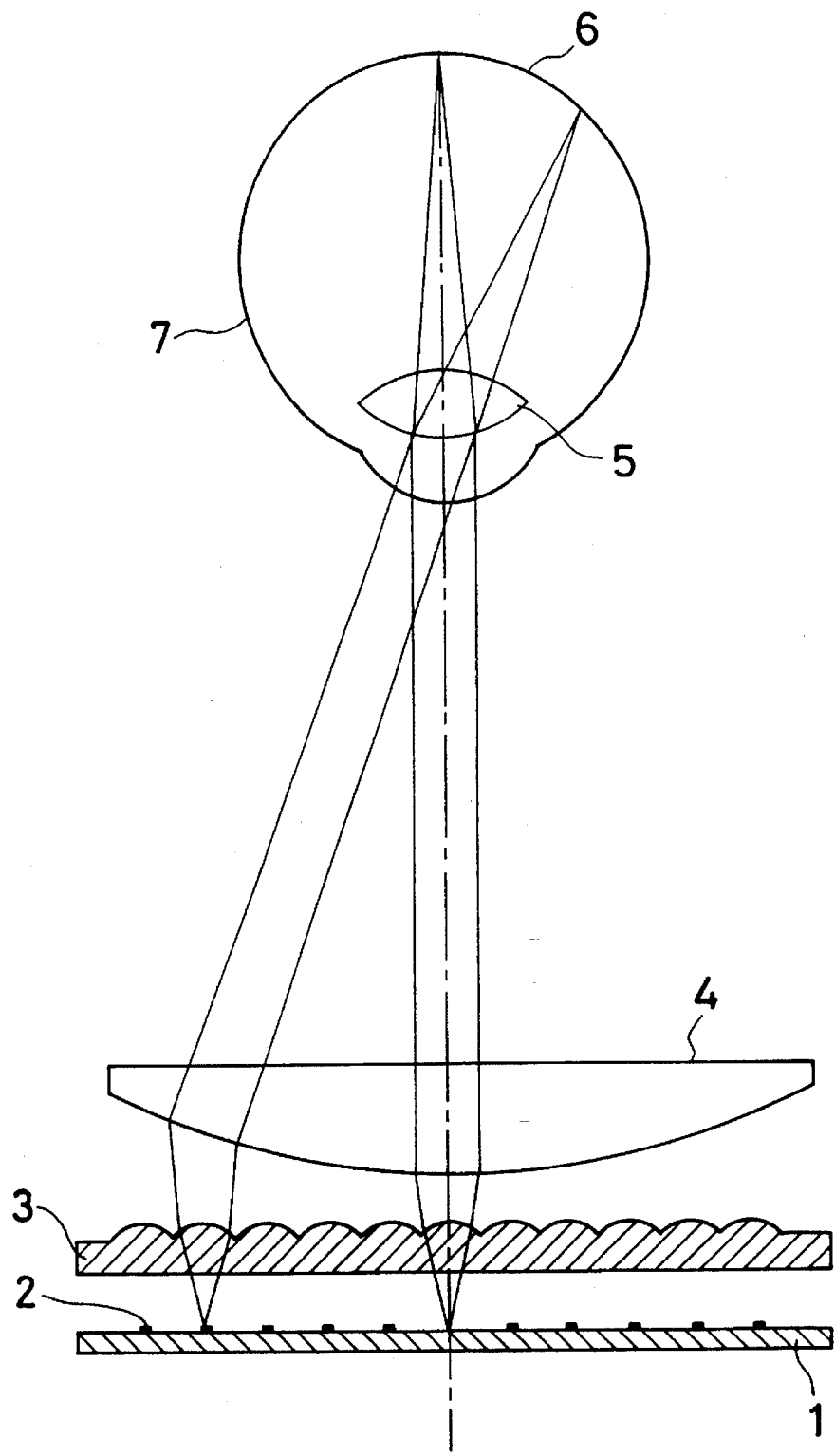
FIG. 1 is an optical path diagram showing a first embodiment of the image display apparatus according to the present invention.

A first embodiment of the present invention will be explained below with reference to the optical path diagram of FIG. 1. Referring to FIG. 1, in front of an eyeball 7 including a crystalline lens 5 and a retina 6, a condenser lens 4 and a microlens array 3 are disposed in the mentioned order from the eyeball side. Further, a substrate 1 which is provided with an LED array 2 for displaying a character, an image, etc. is disposed in front of the microlens array 3. Although in FIG. 1 the LED array 2 is shown as a one-dimensional array extending within the plane of the paper, it is actually a two-dimensional array which also extends in a direction normal to the plane of FIG. 1. The same is the case with the microlens array 3.

In the above-described arrangement, a character or an image is formed on the LED array 2 provided on the substrate 1 by controlling the emission of light from the LED array 2 by an LED array control means (not shown). Beams of light emitted from LEDs, which constitute the LED array 2, are converted into parallel beams of light through the respective microlenses of the microlens array 3, which are arranged at a pitch approximately equal to the pitch of the LEDs of the LED array 2, and through the condenser lens 4, which is common to the LEDs. Then, the parallel light beams enter the crystalline lens 5. The microlens array 3 mainly functions to convert a light beam from each LED into an approximately parallel beam of light, while the condenser lens 4 mainly functions to converge each parallel light beam on the pupil of the eyeball 7. The light beams transmitted by the crystalline lens 5 converge on the retina 6 to form the image of the LED array 2. If the effective aperture of each microlens in the microlens array 3, that is, the pitch of the LEDS constituting the LED array 2, is excessively large, the image of the LED array 2 is formed on the retina 6 as an image composed of points which are unfavorably spread apart from each other. Conversely, if the effective aperture of the microlens array 3 is reduced, a diffraction image is formed on the retina 6. Accordingly, the resolution is deteriorated.

Therefore, the optimal pitch of the microlens array 3 (i.e., the optimal pitch of the LED array 2) is obtained as follows. The resolving power R of the LED image formed on the retina 6 may be expressed by $$R = (0.61 \times \lambda)/NA \ (\mu m)$$

where $\lambda$ represents the wavelength of incident light, and NA represents the numerical aperture on the image side. If the F-number on the image side is represented by $F_e$, $$NA = 1/(2F_e)$$

Since $$F_e = f_e/P$$

the resolving power R is given by $$R = (0.61 \times \lambda)/NA = 0.61 \times 0.5 \times 2F_e (\mu m)$$

-continued $$= 0.61 f_e/P$$

where $f_e$ represents the focal length (μm) of the eye (it should be noted that the focal length is defined as the distance from the nodal point to the focal point), and P represents the cell pitch of the display device 2, which is approximately equal to the effective aperture of the microlens array 3. The wavelength of the incident light beam is assumed to be 0.5 μm.

Assuming that the half field angle is Θ and the effective aperture of the display device 2 is L (μm) and the number of pixels as seen on a straight line is N, since L=NP, the cell pitch p in the eye is given by $$p=2f_e\tan\Theta/N=2P\tan\Theta/L\times f_e$$

Assuming that the optimal pitch is $P_o$, p and R are made equal to each other from the expression of the resolving power R and the expression of the cell pitch p in the eye as follows:

$$0.61/P_o=2P_o\tan\Theta/L$$

$$P_o^2=0.61L/(2\tan\Theta)=0.31L/\tan\Theta$$

$$\therefore P_o=0.55(L/\tan\Theta)^{1/2}$$

If the display device 2 is formed by arranging LEDs respectively emitting red, blue and green light in a mosaic configuration in order to display a color image, $P_o$ represents the pitch between each pair of adjacent cells of the same color.

The number $N_o$ of pixels which is determined when the pitch of the display device 2 is optimized is given by $$N_o=L/P_o=1.82(L\cdot\tan\Theta)^{1/2}$$

If the half field angle 8 in the horizontal direction and the effective aperture L of the display device 2 are assumed to be Θ=15° and $L=30\times10^3$ μm, respectively, the number of cells in the horizontal direction=1.82(30× $10^3\cdot\tan15°)^{1/2}$=163 the pitch in the horizontal direction=184 μm

If the effective aperture of the display device 2 in the vertical direction is assumed to be $20\times10^3$ μm, the number of cells in the vertical direction=1.82(20× $10^3\cdot\tan10.1°)^{1/2}$=108 the pitch in the vertical direction=185 μm

Accordingly, the total number of pixels is 163×108=17, 604 (pixels).

Assuming that the cell aperture of the display device is $\theta$, the aperture of the cell image formed in the eye is ψ and $f_o$ represents the composite focal length of the microlens array 3 and the condenser lens 4, since the magnification M of projection of the LED cell on the fundus oculi is $M=f_e/f_o$, the following relationship is given:

$$\psi=M\theta=f_e\psi/f_o$$

In order to arrange cells so that the boundaries of the cell images lie in contact with each other on the fundus oculi, the following condition must be satisfied:

$$\psi=p$$

$$f_e\psi/f_o=p=2f_e\tan\Theta/N$$

$$\therefore \psi=2f_o\tan\Theta/N$$

If $f_o$ is assumed to be 2,000 μm, $$\psi_x=2\times2,000\times\tan15°/163=6.5\ \mu m\ \text{(horizontal direction)}$$

$$\psi_y=2\times2,000\times\tan10.1°/108=6.5\ \mu m\ \text{(vertical direction)}$$

If the cell aperture is larger than the above, the resolution lowers, whereas, if the cell aperture is smaller than the above, the resolution does not rise substantially, and the cell boundaries become conspicuous. In a case where the display device 2 is formed by arranging LEDs respectively emitting red, blue and green light in a mosaic configuration, the resolution will not lower even if cell images of different colors overlap each other. In such a case, therefore, ψ may be from two to four times that represented by the above expression.

Figure 5:
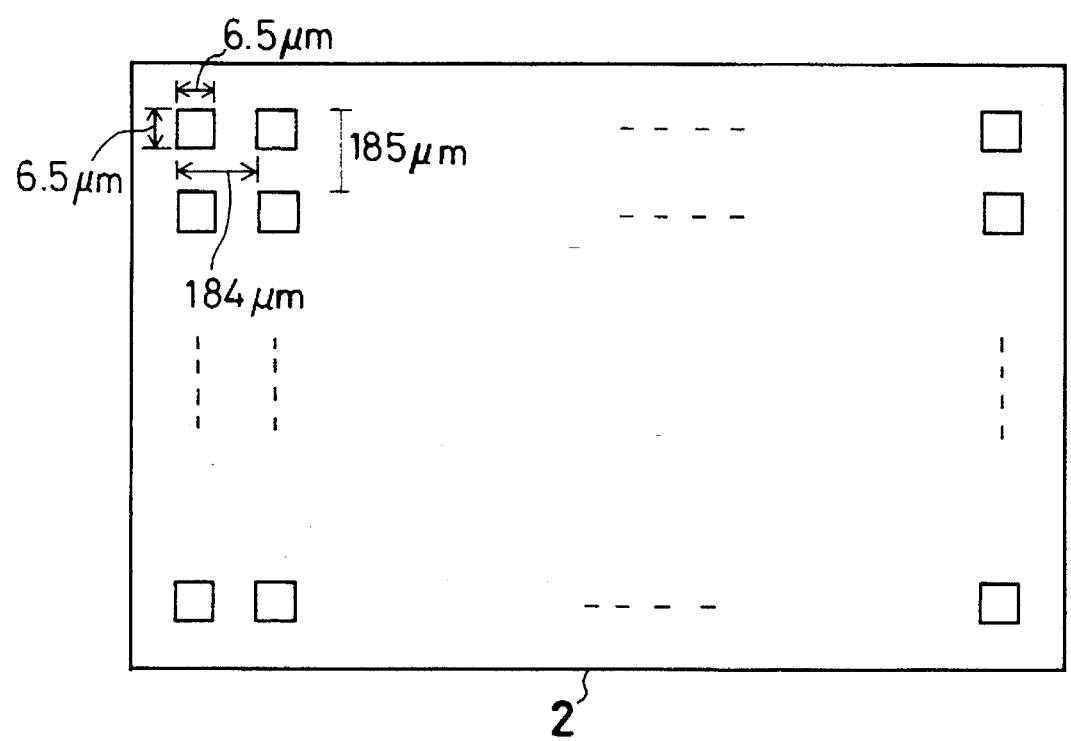
FIG. 5 is a plan view of one example of an optimized two-dimensional display device.

It will be clear from the above examination that an optimal image can be obtained by arranging two-dimensional display cells as shown in the plan view of FIG. 5.

Figure 2:
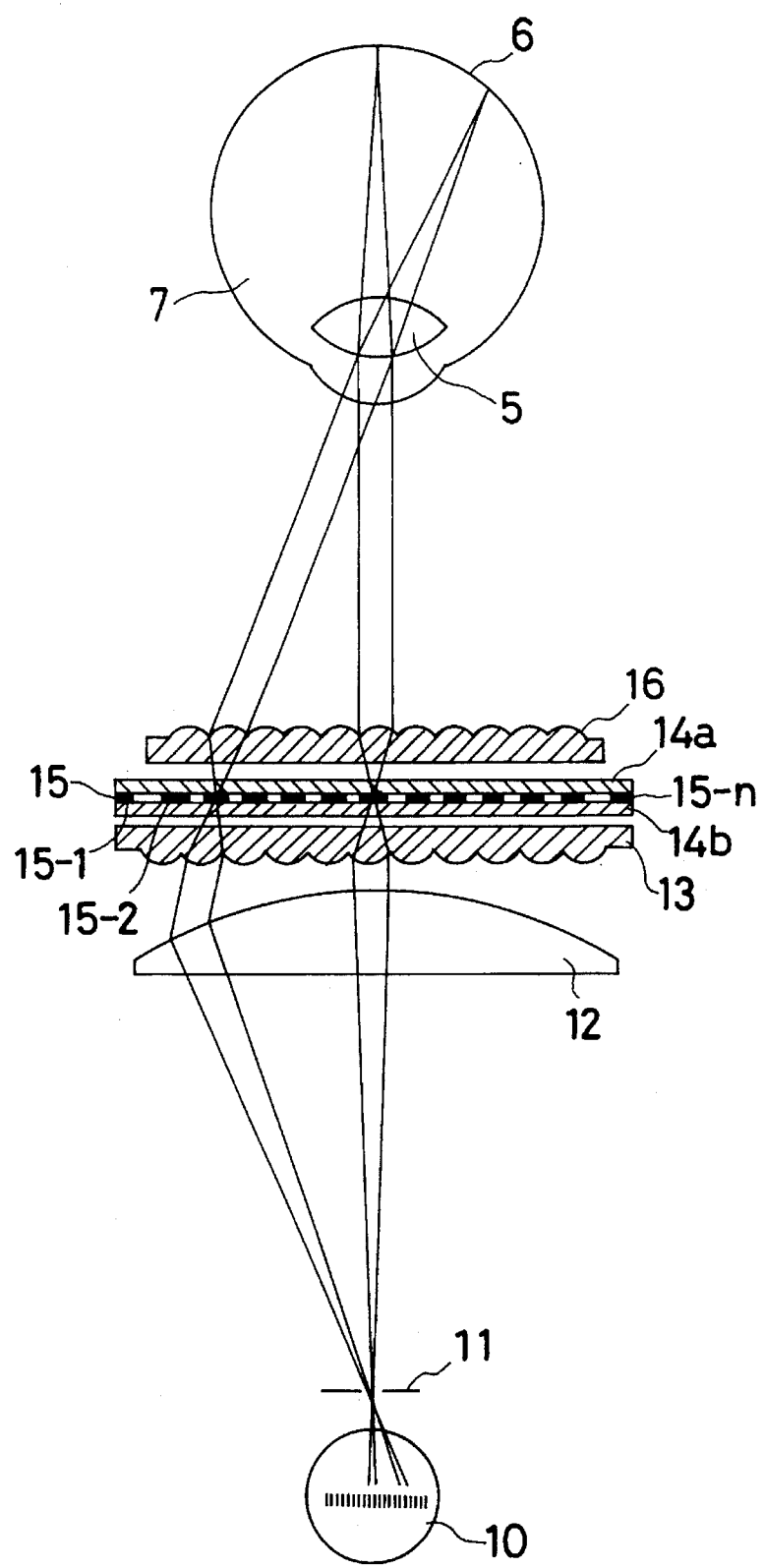
FIG. 2 is an optical path diagram showing a second embodiment of the image display apparatus according to the present invention.

Next, a second embodiment of the present invention will be explained with reference to the optical path diagram of FIG. 2. Referring to the figure, in front of an eyeball 7 including a crystalline lens 5 and a retina 6, microlens arrays 16 and 13 are disposed in the mentioned order from the eyeball side. Between the microlens arrays 16 and 13 is provided a liquid crystal layer 15 that is sandwiched between parallel flat plates 14a and 14b for displaying a character or an image. Although in FIG. 2 the array of liquid crystal cells 15-1 to 15-n is shown as a one-dimensional array extending within the plane of the paper, it is actually a two-dimensional array which also extends in a direction normal to the plane of FIG. 2. The same is the case with the microlens arrays 16 and 13. A condenser lens 12 is provided in front of the microlens array 13. Further, a pinhole 11 and a surface illuminant 10 are disposed in front of the condenser lens 12.

In the above-described arrangement, a character or an image is formed on the liquid crystal layer 15, which is sandwiched between the parallel flat plates 14a and 14b, by controlling the applied voltage for each of the cells 15-1 to 15-n by a liquid crystal control means (not shown). Beams of light emitted from the external light source and transmitted by the liquid crystal cells 15-1 to 15-n are converted into parallel beams of light through the microlens array 16 having a somewhat smaller pitch than the pitch of the liquid crystal cells 15-1 to 15-n, and the parallel light beams enter the crystalline lens 5. The light beams transmitted by the crystalline lens 5 converge on the retina 6 to form images of the liquid crystal cells. A parallel light beam that is transmitted by the m-th microlens counted from the center of the microlens array 16 has an inclination with respect to the optical axis, as shown in the figure. If the focal length of the microlens array 16 is assumed to be $f_o$, the angle of inclination is $\tan^{-1}\{(\xi\times m)/f_o\}$, where ξ represents the difference in pitch between the liquid crystal cells 15-1 to 15-n and the microlens array 16. Thus, the condenser lens 4 that is employed in the first embodiment is unnecessary in this embodiment.

The liquid crystal cell aperture (the aperture of the display part in the cell) is preferably $(2f_o\tan\Theta)/N$, as described in the first embodiment. The numerical value of the cell aperture is likely to be as small as several μm. However, it is theoretically difficult to make the liquid crystal cell aperture smaller than the thickness (about 10 μm) of the liquid crystal layer. If the cell aperture is excessively large, the cell images formed on the retina 6 overlap each other, so that the resolution is deteriorated. Therefore, an external light source that comprises the surface illuminant 10, the pinhole 11, the condenser lens 12 and the microlens array 13 is provided, as shown in the figure. Light beams emitted from the surface illuminant 10 enter the condenser lens 12 through the pinhole 11. The light beams incident on the condenser lens 12 are converged on the respective liquid crystal cells 15-1 to 15-n by the condenser lens 12 and the microlens array 13. The diameter of a spot that illuminates each liquid crystal cell is determined by the diameter of the pinhole 11 and the composite magnification of the condenser lens 12 and the microlens array 13, and the diameter of the spot determines the real size of the liquid crystal cell. Accordingly, the described arrangement enables an optimal image to be formed on the retina 6 even if the liquid crystal cell size is larger than the optimal size. It should be noted that the pitch of the microlens array 13 is preferably set somewhat larger than the pitch of the liquid crystal cells 15-1 to 15-n so that all the light beams transmitted by the pinhole 11, the condenser lens 12, the microlens array 13, the liquid crystal cells 15-1 to 15-n, and the corresponding units in the microlens array 16 enter the crystalline lens 5.

Figure 3:
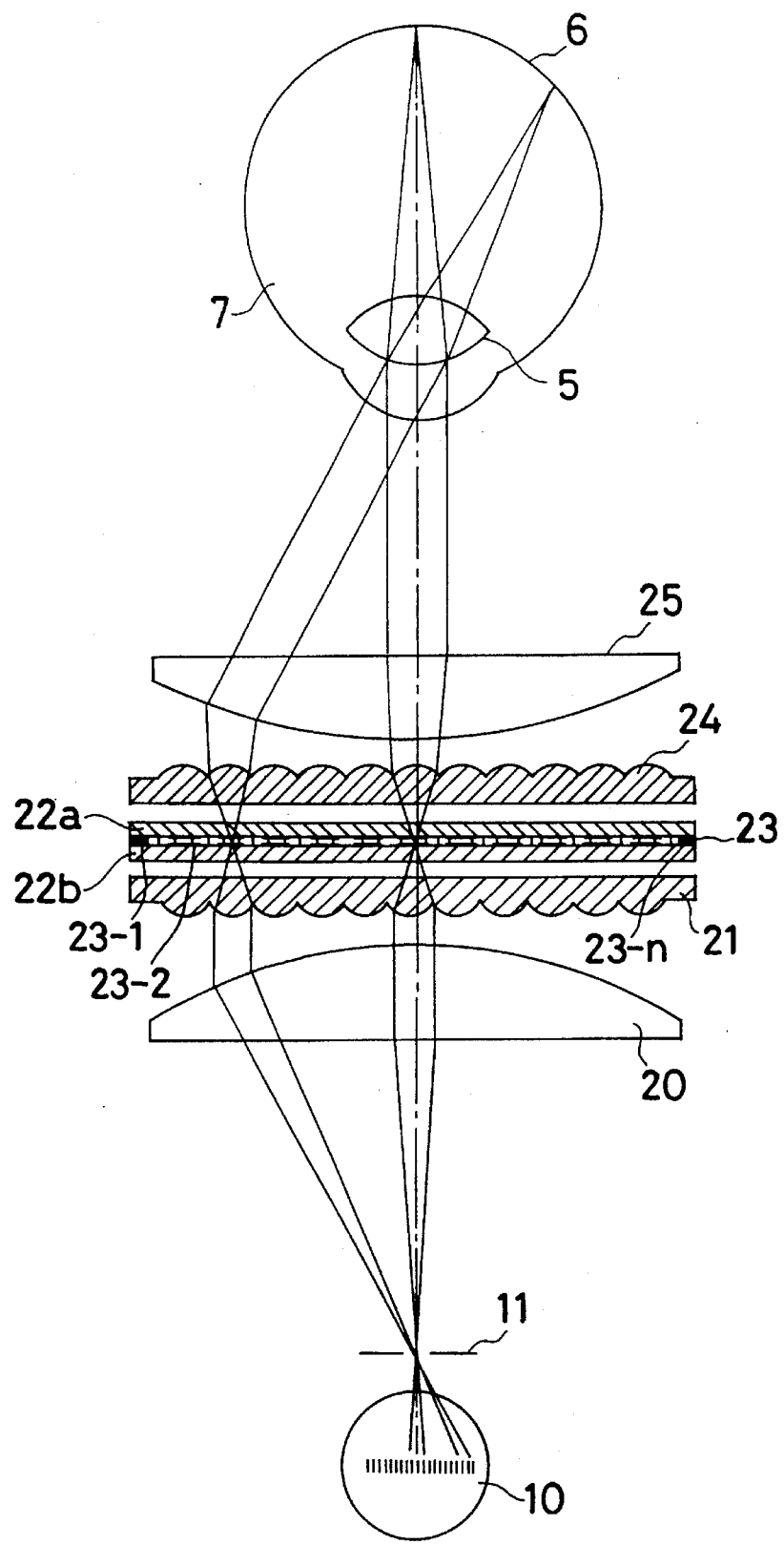
FIG. 3 is an optical path diagram showing a third embodiment of the image display apparatus according to the present invention.

Next, a third embodiment of the present invention will be explained with reference to the optical path diagram of FIG. 3. Referring to the figure, in front of an eyeball 7 including a crystalline lens 5 and a retina 6, a condenser lens 25 and microlens arrays 24 and 21 are disposed in the mentioned order from the eyeball side. Between the microlens arrays 24 and 21 is provided a liquid crystal layer 23 that is sandwiched between parallel flat plates 22a and 22b for displaying a character or an image. Although in FIG. 3 the array of liquid crystal cells 23-1 to 23-n is shown as a one-dimensional array extending within the plane of the paper, it is actually a two-dimensional array which also extends in a direction normal to the plane of FIG. 3. The same is the case with the microlens arrays 24 and 21. A condenser lens 20 is provided in front of the microlens array 21. Further, a pinhole 11 and a surface illuminant 10 are disposed in front of the condenser lens 20.

In the above-described arrangement, a character or an image is formed on the liquid crystal layer 23, which is sandwiched between the parallel flat plates 22a and 22b, by controlling the applied voltage for each of the cells 23-1 to 23-n by a liquid crystal control means (not shown). Beams of light emitted from the surface illuminant 10 enter the condenser lens 20 through the pinhole 11. Parallel light beams emerging from the condenser lens 20 enter the microlens array 21 and form spots on the liquid crystal cells 23-1 to 23-n, respectively. The light beams transmitted by the liquid crystal cells 23-1 to 23-n are converted into parallel beams of light through the microlens array 24 having a pitch approximately equal to the pitch of the liquid crystal cells 23-1 to 23-n and through the condenser lens 25, which is common to the cells. Then, the parallel light beams enter the crystalline lens 5. The light beams transmitted by the crystalline lens 5 converge on the retina 6 to form the images of the liquid crystal cells.

Even in a case where the pitch of the liquid crystal cells and that of the microlens array 24 are approximately equal to each other as in this embodiment, the desired image can be formed on the retina 6 by inserting the condenser lens 25. It is preferable with a view to obtaining a bright image that the pitch of the microlens array 21 should also be approximately equal to the pitches of the liquid crystal cells and the microlens array 24.

Figure 4:
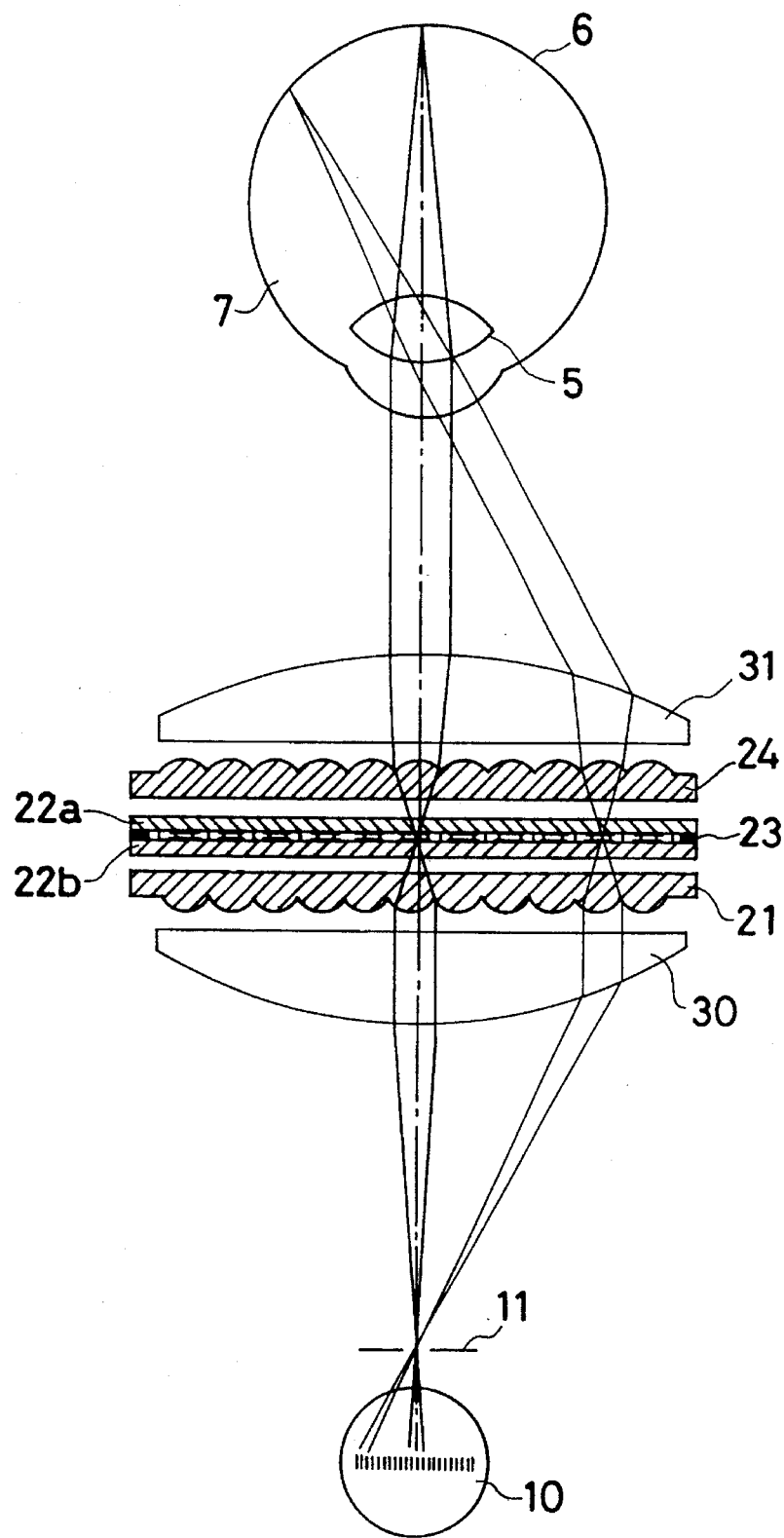
FIG. 4 is an optical path diagram showing a modification of the third embodiment.

This embodiment is not necessarily limited to the above-described arrangement. For example, the direction of each of the condenser lenses 20 and 25, shown in FIG. 3, may be reversed, as shown by reference numerals 30 and 31 in FIG. 4.

As described in the foregoing first to third embodiments, it is necessary, in order to obtain a high resolution in an image display apparatus employing a microlens array, to increase the number of pixels of a two-dimensional display device comprising the LED array 2. However, since the size of the LED array 2 is restricted by the overall size of the apparatus, the pixel pitch must be reduced in order to increase the number of pixels. Consequently, the effective aperture of each microlens constituting the microlens array 3 also decreases. As to the image of each pixel of the LED array 2, which is formed on the retina 6 in the user's eye, if the effective aperture of each constituent microlens of the microlens array 3 is large, the numerical aperture NA of the pixel image is large, whereas, if the effective aperture is small, the NA is small, as will be clear from FIG. 1. In other words, as the number of pixels of the LED array 2 increases, NA decreases. Accordingly, the image of each pixel that is formed on the retina 6 becomes unsharp by the action of diffraction. Therefore, even if the number of pixels is increased, when it is beyond a certain level, there will be no more improvement in the resolution. That is, the resolution is limited even in an image display apparatus such as that shown in FIG. 1.

Therefore, in fourth to seventh embodiments shown below, diffraction optical elements comprising Fresnel zone plates are employed in place of the microlenses to thereby overcome the above-described disadvantage.

Figure 6:
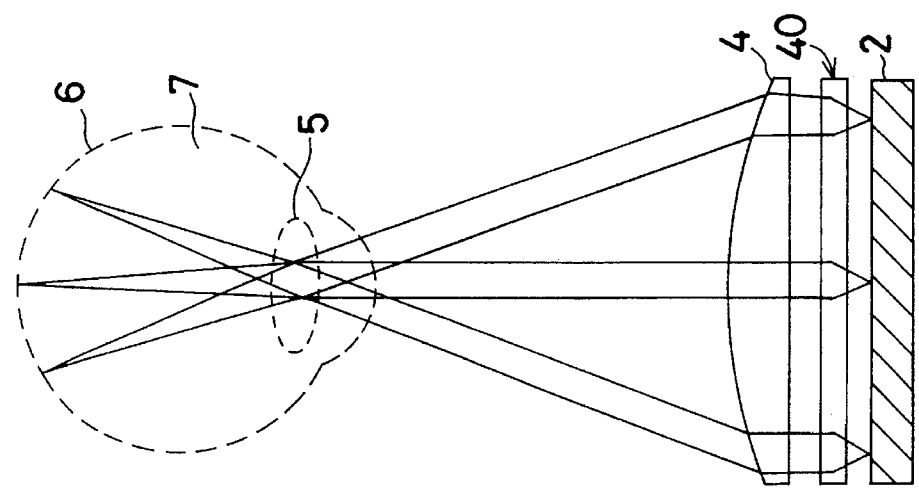
FIG. 6 is an optical path diagram showing the whole optical system of a fourth embodiment of the image display apparatus according to the present invention.
Figure 7:
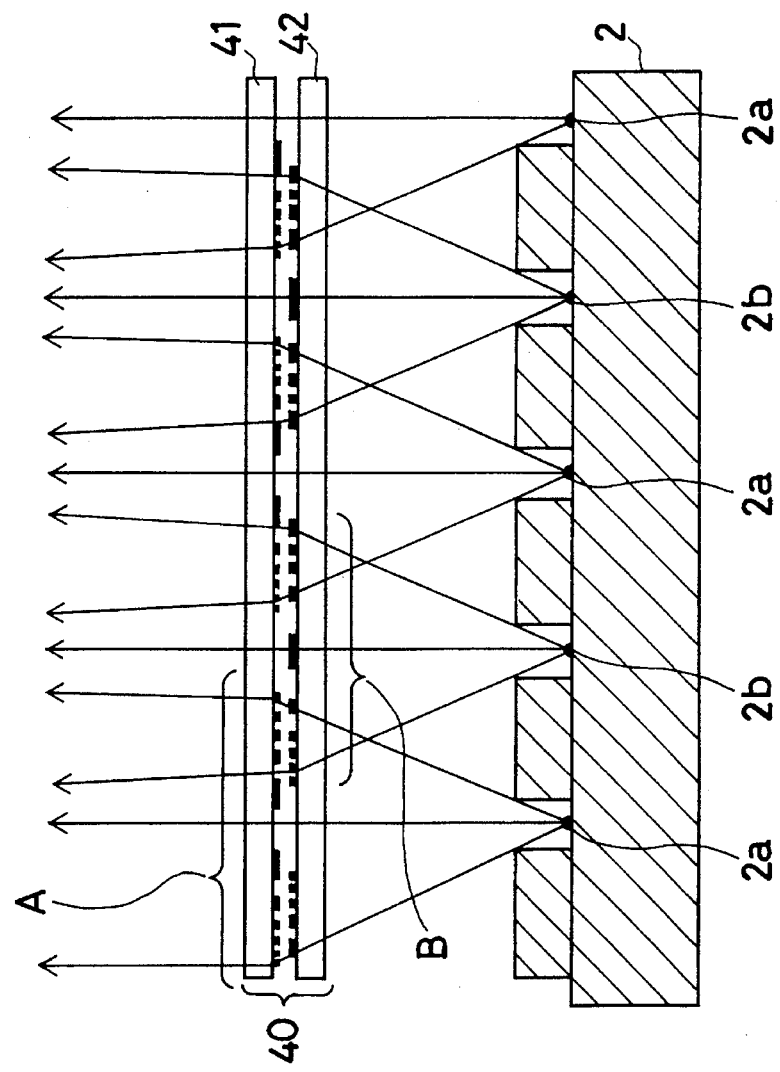
FIG. 7 is an enlarged view of a two-dimensional display device and a Fresnel zone plate block in the fourth embodiment.

A fourth embodiment will be explained below with reference to FIGS. 6 to 9. FIG. 6 is an optical path diagram showing the whole optical system of the image display apparatus according to this embodiment. FIG. 7 is an enlarged view showing a two-dimensional display device and a Fresnel zone plate block, which are employed in this embodiment. The basic arrangement of the image display apparatus according to this embodiment is the same as that of the first embodiment. That is, in front of an eyeball 7 including a crystalline lens 5 and a retina 6, a field lens 4 and a Fresnel zone plate block 40 are disposed in the mentioned order from the eyeball side, and an LED array 2, which comprises LEDs 2a and 2b arranged in a two-dimensional array for displaying a character, an image, etc., is disposed in front of the Fresnel zone plate block 40. In this arrangement, a character or an image is formed on the LED array 2 by controlling the emission of light from the LEDs 2a and 2b on the LED array 2 by an LED array control means (not shown). A beam of light emitted from each LED constituting the LED array 2 is converted into a parallel beam of light through the Fresnel zone plate block 40, which has a pitch approximately equal to the pitch of the LEDs constituting the LED array 2, and through the field lens 4, which is common to the LEDs. Then, the parallel light beam enters the crystalline lens 5. The Fresnel zone plate block 40 mainly functions to convert the light beam from each LED into an approximately parallel beam of light, while the field lens 4 mainly functions to converge each parallel light beam on the pupil of the eyeball 7. The light beams transmitted by the crystalline lens 5 converge on the retina 6 to form the images of the LEDs. Accordingly, the image of the LED array 2 is formed on the retina 6.

Figure 8:
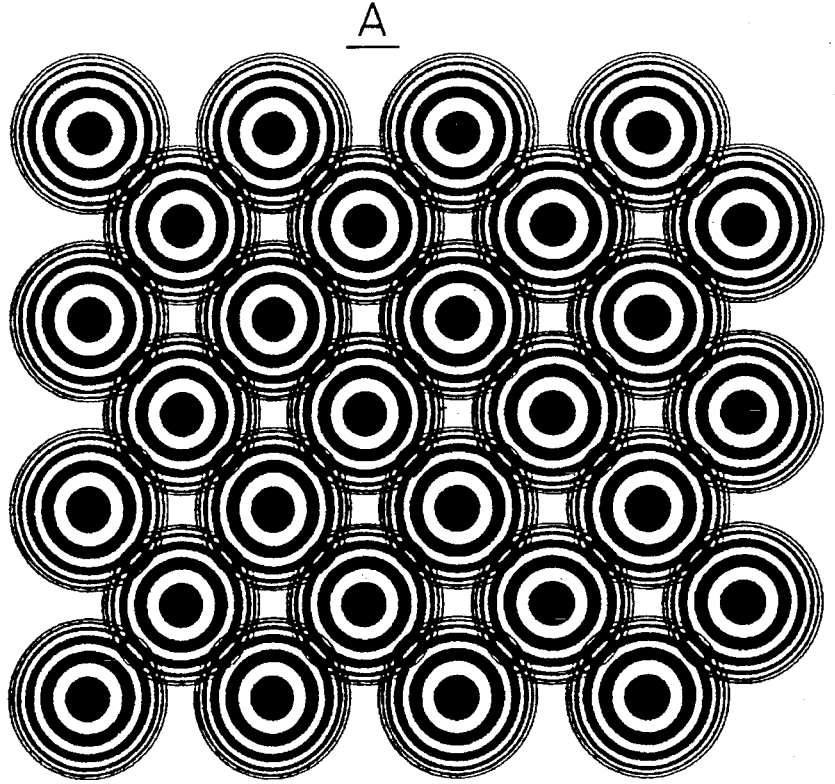
FIG. 8 is a plan view of a Fresnel zone plate pattern formed on one of a pair of substrates.
Figure 9:
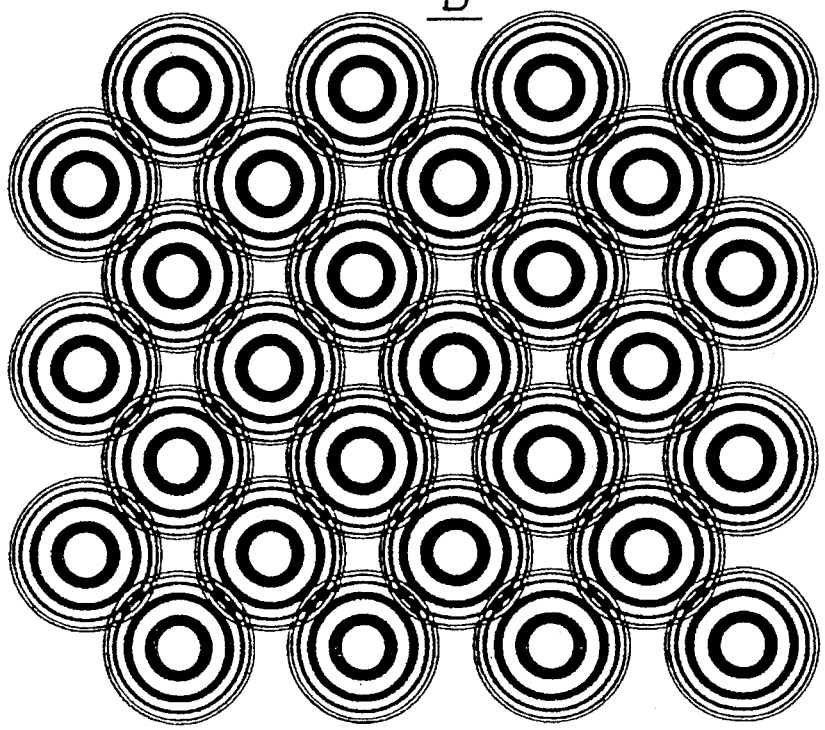
FIG. 9 is a plan view of a Fresnel zone plate pattern formed on the other substrate.

Unlike the microlens arrays in the first to third embodiments, which are formed by arranging small lenses in an array, the Fresnel zone plate block 40 in this embodiment comprises a pair of substrates 41 and 42 which have respective minute Fresnel zone plates A and B arrayed thereon and which are disposed to face each other. FIGS. 8 and 9 respectively show Fresnel zone plate diffraction grating patterns A and B which are formed on the substrates 41 and 42. FIG. 7 shows rays of light which are emitted from adjacent pixels 2a and 2b, which are alternately disposed to form the LED array 2. The divergence angle of light emitted from each pixel is limited by the cross-sectional configuration of the LED array 2. In FIG. 7, only the central and marginal rays are shown. The ray of light emitted from each pixel 2a is rectilinearly propagated at the Fresnel zone plate B formed on the substrate 42 under the action of zero-order diffraction, and at the Fresnel zone plate A formed on the substrate 41, the light ray is converted into an approximately parallel beam of light under the action of first-order diffraction. On the other hand, the ray of light emitted from each pixel 2b is converted into an approximately parallel beam of light at the Fresnel zone plate B formed on the substrate 42 under the action of first-order diffraction, and at the Fresnel zone plate A formed on the substrate 41, the light ray is rectilinearly propagated as it is under the action of zero-order diffraction. These rays of light are transmitted by the field lens 4 to form an image composed of the pixels 2a and 2b on the retina 6 in the user's eye.

In this embodiment, a diffraction optical element comprising a Fresnel zone plate is employed in place of each refracting lens constituting a microlens array in the embodiment shown in FIG. 1. Therefore, diffraction optical elements A and B, which serve as lenses, can be disposed to overlap each other, as shown in FIG. 7. Accordingly, it is unnecessary to reduce the effective apertures of the constituent lenses A and B even if the number of pixels of the LED array 2 is increased and the pitches between the pixels 2a and 2b is reduced. Therefore, the light beam transmitted by each of the constituent lenses A and B is also large in diameter. Consequently, the numerical aperture of the pixel image of the two-dimensional display device comprising the LED array 2, which is formed on the retina 6, is larger in this embodiment than in the first to third embodiments. Thus, the pixel image is formed even more clearly, and a higher resolution is obtained.

Figure 10:
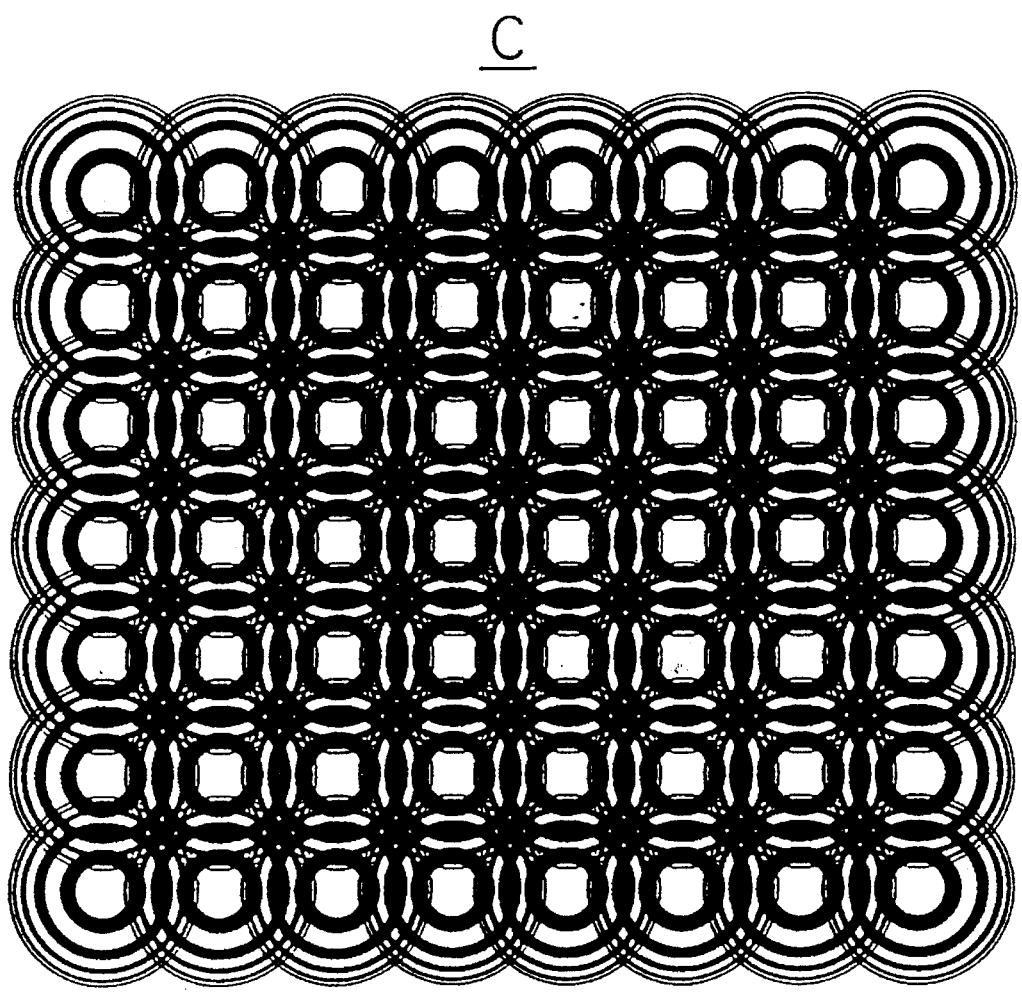
FIG. 10 is a plan view of a Fresnel zone plate pattern formed on a single substrate.

Although in this embodiment the Fresnel zone plate block 40 comprises two substrates 41 and 42, it should be noted that these substrates may be combined together in a single substrate. In such a case, a diffraction grating pattern C which is to be formed on the single substrate is obtained by superimposing the patterns A and B (shown in FIGS. 8 and 9) on one another, as shown in FIG. 10.

Next, a fifth embodiment will be explained with reference to FIGS. 11(a) and 11(b). Although in the fourth embodiment the LED array 2 is used as a two-dimensional display device, a transmissive liquid crystal display device is used in this embodiment in place of the LED array 2. In either of the arrangements shown in FIGS. 11(a) and 11(b), in front of an eyeball 7 including a crystalline lens 5 and a retina 6, a field lens 43, a Fresnel zone plate block 40, which comprises diffraction optical elements similar to those in the arrangement shown in FIG. 7, a transmissive liquid crystal display device 46, and an illumination-side Fresnel zone plate block 40' comprising diffraction optical elements in the same way as in the case of the Fresnel zone plate block 40 are disposed in the mentioned order from the eyeball side. In the arrangement shown in FIG. 11(a), a condenser lens 44 is disposed in front of the Fresnel zone plate block 40'. In the arrangement shown in FIG. 11(b), a beam-condensing reflecting mirror 47 is disposed in front of the Fresnel zone plate block 40'. In both the cases, the condenser 44 and the reflecting mirror 47 are disposed to direct light from a light source 45 toward the Fresnel zone plate block 40'. In such an arrangement, a character or an image is formed on the transmissive liquid crystal display device 46, which comprises a liquid crystal layer sandwiched between a pair of parallel flat plates, by controlling the applied voltage for each cell by a liquid crystal control means (not shown). Light emitted from the light source 45 enters the condenser lens 44 or the beam-condensing reflecting mirror 47. Parallel beams of light emerging therefrom enter the Fresnel zone plate block 40' and form spots on the cells of the transmissive liquid crystal display device 46. The light beams transmitted by the liquid crystal cells are converted into parallel beams of light through the Fresnel zone plate block 40 having a pitch approximately equal to the pitch of the liquid crystal cells and through the field lens 43, which is common to the cells. Then, the parallel light beams enter the crystalline lens 5. The light beams transmitted by the crystalline lens 5 converge on the retina 6 to form the images of the liquid crystal cells. In this case also, the image of each pixel is formed more clearly than in the first to third embodiments, and a higher resolution is obtained, in the same way as in the fourth embodiment.

Figure 12:
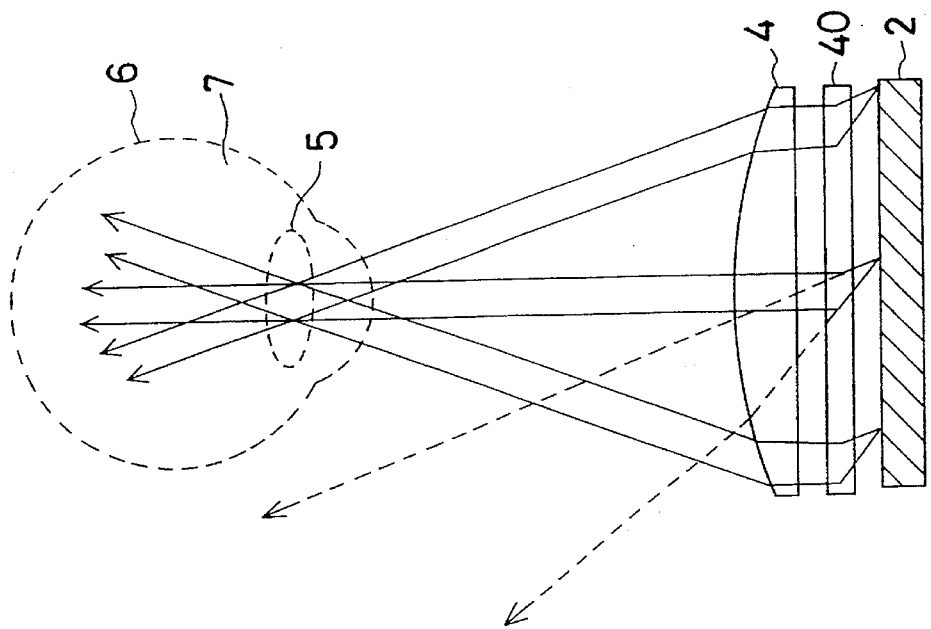
FIG. 12 is an optical path diagram showing the whole optical system of a sixth embodiment of the image display apparatus according to the present invention.
Figure 13:
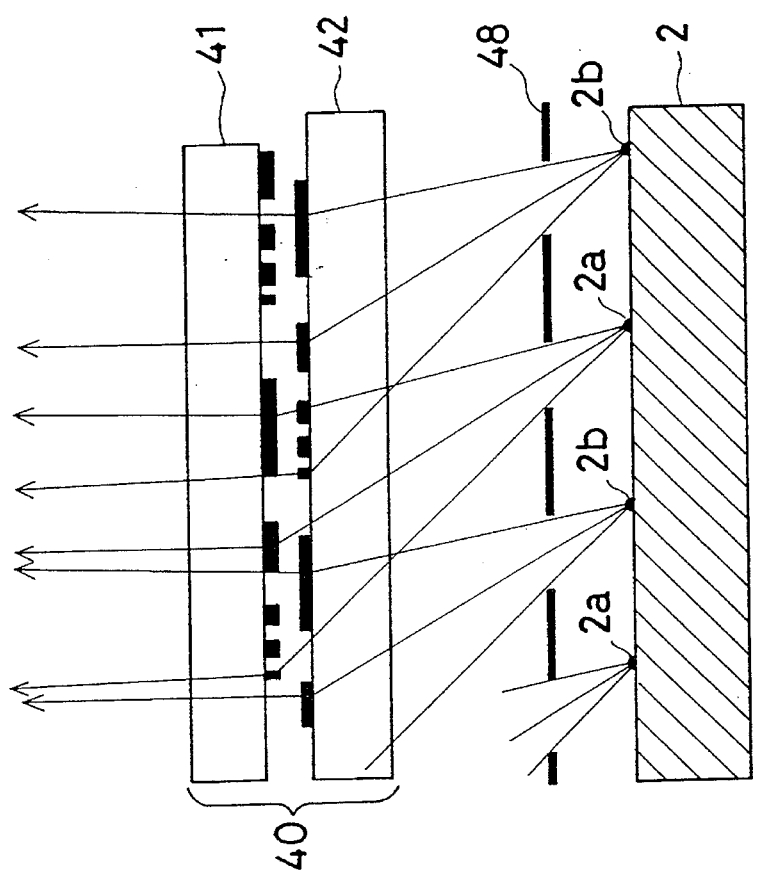
FIG. 13 is an enlarged view of a two-dimensional display device and a Fresnel zone plate block in the sixth embodiment.
Figure 16B:
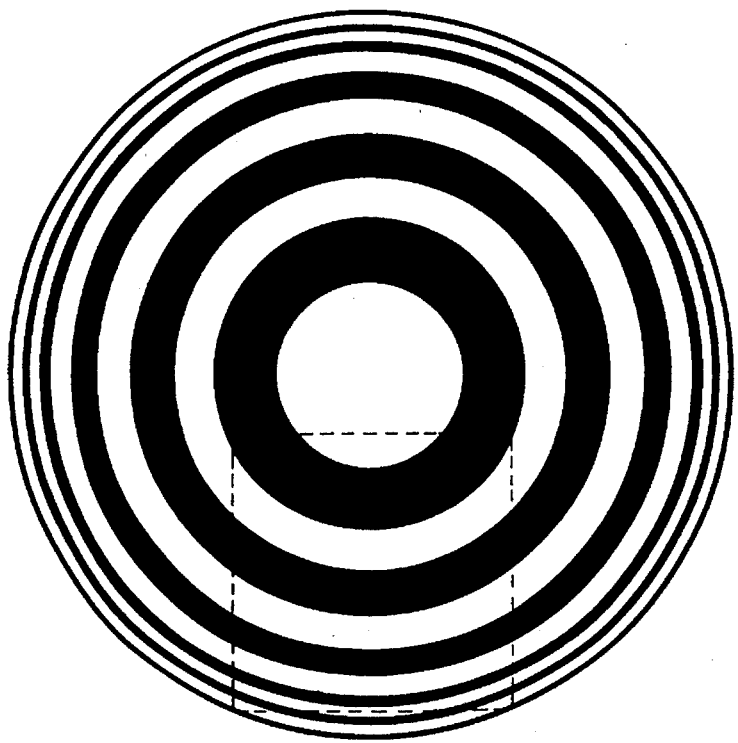
FIGS. 16(a) to 16(d) show the arrangements of diffraction optical elements employed in the fourth to seventh embodiments of the present invention.
Figure 16D:
Figure 16A:
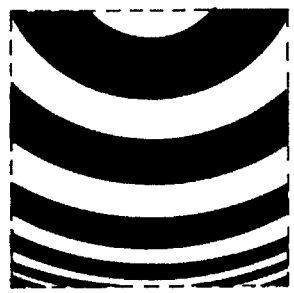

Further, a sixth embodiment will be explained below with reference to FIGS. 12 and 13. FIG. 12 is an optical path diagram showing the whole optical system of the image display apparatus according to this embodiment. FIG. 13 is an enlarged view showing a two-dimensional display device and a Fresnel zone plate block, which are employed in this embodiment. The function of each part is substantially the same as that in the fourth embodiment. The divergence angle of light emitted from each of the pixels 2a and 2b is limited by an aperture stop 48 having apertures corresponding to the pixels 2a and 2b. The divergent bundle of rays is substantially collimated by the Fresnel zone plate block 40 and completely collimated by the field lens 4. The central ray converges on or near the pupil of the user's eyeball 7 or the center of rolling of the eyeball 7. The sixth embodiment differs from the fourth embodiment in that each Fresnel zone plate constituting the Fresnel zone plate block 40 is eccentric. More specifically, a Fresnel zone plate having a pattern shown in the plan view of FIG. 16(a) is used. This pattern is the same as a square chain-line part of an ordinary Fresnel zone plate pattern shown in FIG. 16(b). By the action of such a diffraction lens, the entire light beam, including the central ray, is deviated as shown in FIG. 13. The ray of light that forms a sharp image on the retina 6 is light that undergoes predetermined diffraction in the Fresnel zone plate block 40. However, there is also light which is not subjected to the predetermined diffraction, and such light blurs the image. Particularly, when a Fresnel zone plate is used, zero-order diffracted light, which is not substantially subjected to diffraction, is intense, and this light is harmful. Therefore, in this embodiment each lens constituting the Fresnel zone plate block 40 is made eccentric as described above, thereby deviating all the effective rays, as shown in FIGS. 12 and 13. With this arrangement, zero-order light (shown by the chain line), which is not deviated, deflects so as not to enter the pupil of the user's eye 7. Therefore, substantially no harm will be brought about no matter how high the intensity is.

Figure 14:
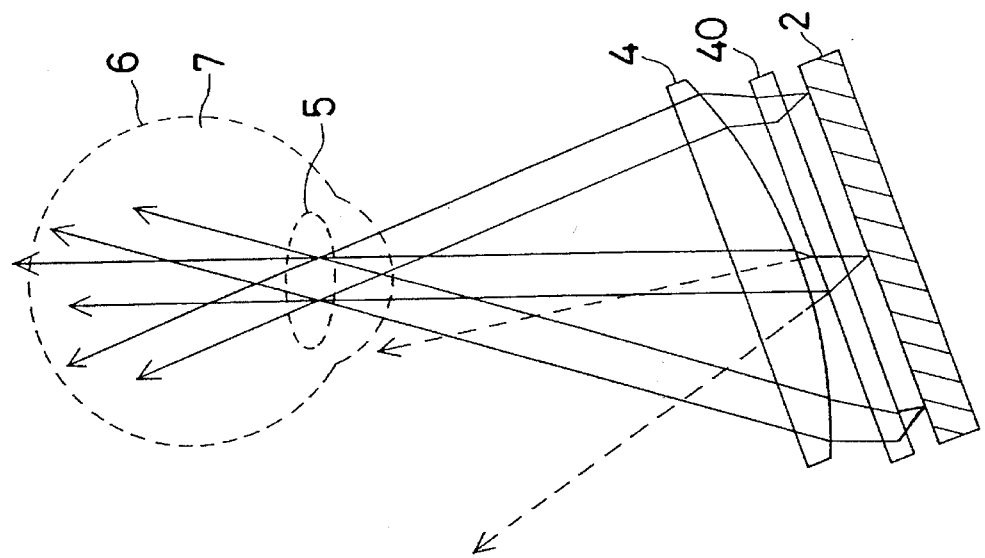
FIG. 14 is an optical path diagram showing the whole optical system of a seventh embodiment of the image display apparatus according to the present invention.
Figure 15:
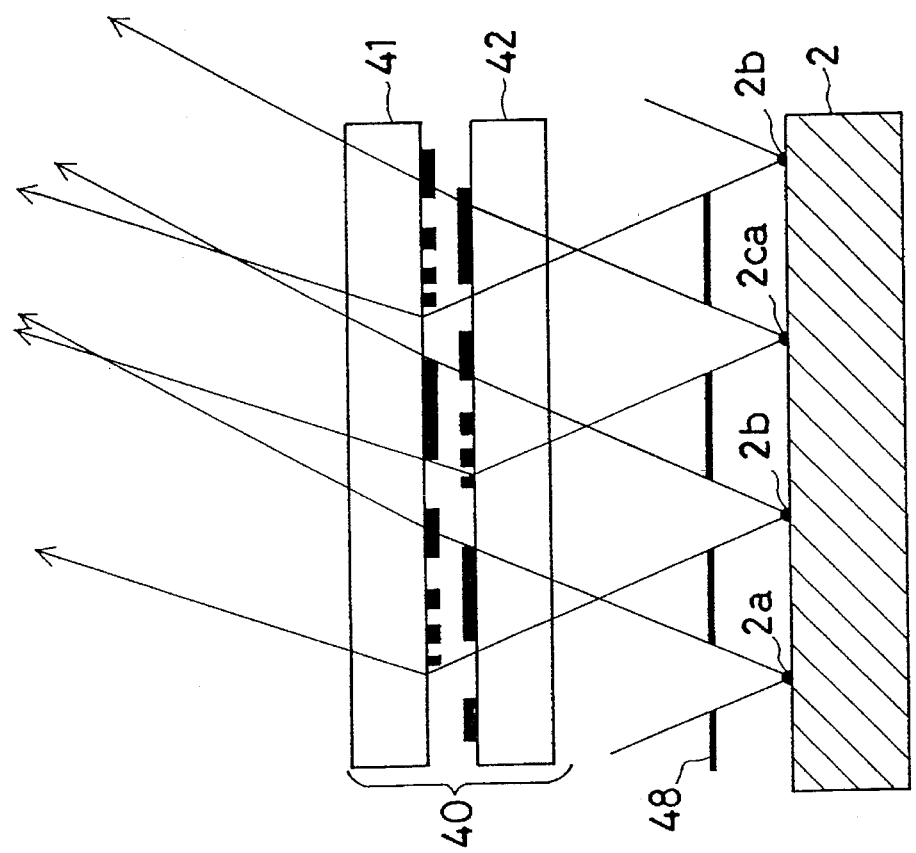
FIG. 15 is an enlarged view of a two-dimensional display device and a Fresnel zone plate block in the seventh embodiment.

Next, a seventh embodiment will be explained with reference to FIGS. 14 and 15. FIG. 14 is an optical path diagram showing the whole optical system of the image display apparatus according to this embodiment. FIG. 15 is an enlarged view showing a two-dimensional display device and a Fresnel zone plate block, which are employed in this embodiment. This embodiment differs from the sixth embodiment in the positional relationship between the two-dimensional display device 2 and the Fresnel zone plate block 40. In the sixth embodiment, light beams that emerge obliquely from the two-dimensional display device 2 are used, whereas in this embodiment, the relative positions of the two-dimensional display device 2 and the Fresnel zone plate block 40 are adjusted so that light beams that emerge from the two-dimensional display device 2 in the illumination direction are used to thereby achieve an improvement.

Figure 16C:
Figure 17:
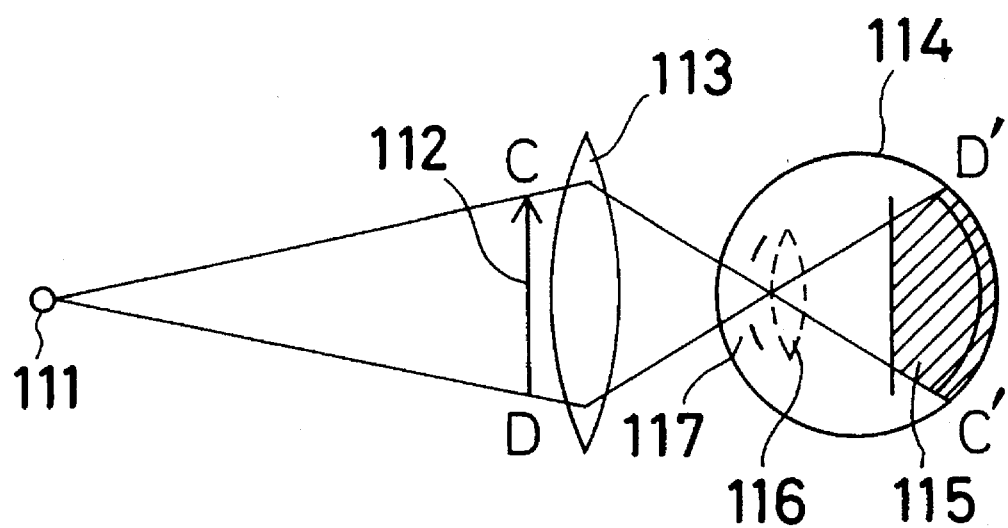
FIG. 17 is an optical path diagram showing a prior art display apparatus.

Although some examples in which Fresnel zone plates are employed as diffraction optical elements for constituting the Fresnel zone plate block 40 have been described above, it is also possible to use any other type of diffraction optical element which has a lens action. For example, a properly blazed diffraction grating can also be used to raise the diffraction efficiency. In the sixth embodiment, it is also possible to use a diffraction optical element with a cross-sectional configuration as shown in FIG. 16(c), which has a function equivalent to that of the Fresnel zone plate shown in FIG. 16(a). Similarly, in the fourth embodiment a diffraction optical element having a cross-sectional configuration as shown in FIG. 16(d) may also be used.

Since the focal length of a lens that comprises a diffraction optical element depends on the wavelength, if the two-dimensional display device emits colored light, e.g., red, blue and green, it is preferable to design the corresponding constituent microlenses of the microlens array in conformity to the wavelengths so that the focal lengths of the lenses are uniform.

In any of the fourth to seventh embodiments, if the diffraction optical elements are properly patterned so as to serve also as a field lens, no field lens is needed. Therefore, it is possible to achieve a reduction in the overall weight of the apparatus.

Although the image display apparatus of the present invention has been described by way of some embodiments, it should be noted that the present invention is not necessarily limited to these embodiments and that various changes and modifications may be imparted thereto.

As will be clear from the foregoing description, the image display apparatus of the present invention includes image display means having a plurality of two-dimensionally disposed pixels, and optical means for converting a beam of light emerging from each pixel into an approximately parallel beam of light and for refracting each light beam toward the observer's eye. Therefore, a beam of light emerging from each pixel is converted into a parallel beam of light and led to the eyeball. Since an array of pixels is reconstructed at a proper pitch on the retina in the eyeball, the observer can perceive an image. Further, since each pixel and the retina in the eyeball are in conjugate relation to each other, the image of each pixel is clearly formed on the retina. Accordingly, an image that is composed of such pixel images is also clear. Thus, the observer can perceive a high-definition image.

If a diffraction optical element array is used as at least a part of the above-described optical means, since the diffraction optical elements can be disposed to overlap each other, it is unnecessary to reduce the effective aperture of each diffraction optical element even if the pixel pitch is reduced. Accordingly, the pixel image becomes even more clear, and a higher resolution can be obtained.

What we claim is:

1. An image display apparatus comprising:

image display means having a plurality of pixels arranged in a two-dimensional array;

optical means for converting beams of light emerging from said plurality of pixels into a plurality of approximately parallel beams of light, and for refracting said plurality of approximately parallel beams of light toward an observer's eye, said optical means including:

first optical means for at least partially collimating said beams of light emerging from said plurality of pixels into a plurality of at least partially collimated diverging beams of light, and second optical means for converting said plurality of at least partially collimated diverging beams of light emerging from said first optical means into said plurality of approximately parallel beams of light and refracting said plurality of approximately parallel beams of light toward said observer's eye; and light-beam limiting means having apertures each having an optical axis which corresponds to a respective optical axis of one of said plurality of pixels, said light-beam limiting means being disposed in between said image display means and said first optical means;

said first optical means being a diffraction optical element array having a plurality of diffraction optical elements each having an optical axis which corresponds to a respective optical axis of one of said plurality of pixels of said image display means, and each of said plurality of diffraction optical elements being disposed to overlap at least one of said plurality of diffraction optical elements adjacent thereto; and said image display means, said light-beam limiting means, and said diffraction optical element array being disposed so that zero-order light transmitted by said diffraction optical element array does not enter said observer's eye.

2. An image display apparatus according to claim 1, wherein each of said plurality of diffraction optical elements is a Fresnel zone plate.

3. An image display apparatus comprising:

image display means having a plurality of pixels arranged in a two-dimensional array; and optical means for converting beams of light emerging from said plurality of pixels into a plurality of approximately parallel beams of light, and for refracting said plurality of approximately parallel beams of light directly toward a retina of an observer's eye, each of said plurality of pixels having a conjugate relationship with said retina of said observer's eye;

said apparatus being a spectacle-type image display apparatus; and said apparatus projecting an image directly on both of said observer's eyes.

4. An image display apparatus comprising:

image display means having a plurality of pixels arranged in a two-dimensional array;

optical means for converting beams of light emerging from said plurality of pixels into a plurality of approximately parallel beams of light, and for refracting said plurality of approximately parallel beams of light directly toward a pupil of an observer's eye; and stop means having a plurality of apertures respectively corresponding to said plurality of pixels, for limiting an angle of divergence of light emerging from each of said plurality of pixels of said image display means.

5. An image display apparatus according to claim 4, wherein said optical means includes:

first optical means for at least partially collimating said beams of light emerging from said plurality of pixels into a plurality of at least partially collimated diverging beams of light; and second optical means for converting said plurality of at least partially collimated diverging beams of light emerging from said first optical means into said plurality of approximately parallel beams of light and refracting said approximately parallel beams of light toward said observer's eye.

6. An image display apparatus according to claim 5, wherein said first optical means is a diffraction optical element array having a plurality of diffraction optical elements each having an optical axis which corresponds to a respective optical axis of one of said plurality of pixels of said image display means, each of said plurality of diffraction optical elements being disposed to overlap at least one of said plurality of diffraction optical elements adjacent thereto.

7. An image display apparatus according to claim 4, wherein said optical means is a diffraction optical element array having a plurality of diffraction optical elements each having an optical axis which corresponds to a respective optical axis of one of said plurality of pixels of said image display means, each of said diffraction optical elements being disposed to overlap at least one of said plurality of diffraction optical elements adjacent thereto.

8. An image display apparatus comprising:
image display means having a plurality of pixels arranged in a two-dimensional array, said image display means comprising:
a transmissive flat display panel having said plurality of pixels,
a first microlens array having a plurality of microlenses each having an optical axis which corresponds to a respective optical axis of one of said plurality of pixels,
a condenser lens, and
light source means having a minute light-emitting part, said light source means including a surface illuminant, and a pinhole stop for passing beams of light from said surface illuminant,
wherein beams of light emitted from said light source means are converged on said plurality of pixels of said transmissive display panel by said condenser lens and said first microlens array; and
optical means for converting beams of light emerging from said plurality of pixels into a plurality of approximately parallel beams of light, and for refracting said plurality of approximately parallel beams of light directly toward a pupil of an observer's eye, said optical means including:
first optical means for at least partially collimating said beams of light emerging from said plurality of pixels into a plurality of at least partially collimated diverging beams of light, said first optical means being a second microlens array having a plurality of microlenses each having an optical axis which corresponds to a respective optical axis of one of said plurality of pixels of said image display means, and
second optical means for converting said plurality of at least partially collimated diverging beams of light emerging from said first optical means into said plurality of approximately parallel beams of light and refracting said plurality of approximately parallel beams of light toward said observer's eye, said second optical means being a positive lens.

9. An image display apparatus comprising:
image display means having a plurality of pixels arranged in a two-dimensional array, said image display means comprising:
a transmissive flat display panel having said plurality of pixels,
a first microlens array having a plurality of microlenses each having an optical axis which corresponds to a respective optical axis of one of said plurality of pixels,
a condenser lens, and
light source means having a minute light-emitting part, said light source means including a surface illuminant, and a pinhole stop for passing beams of light from said surface illuminant,
wherein beams of light emitted from said light source means are converged on said plurality of pixels of said transmissive display panel by said condenser lens and said first microlens array; and
optical means for converting beams of light emerging from said plurality of pixels into a plurality of approximately parallel beams of light, and for refracting said plurality of approximately parallel beams of light directly toward a pupil of an observer's eye, said optical means being a second microlens array having a plurality of microlenses each having an optical axis which corresponds to a respective optical axis of one of said plurality of pixels of said image display means, a plurality of optical axes of said plurality of microlenses being eccentric with respect to corresponding ones of said plurality of pixels of said image display means at a peripheral part of said image display means.

10. An image display apparatus comprising:
image display means having a plurality of pixels arranged in a two-dimensional array, said image display means comprising:
a transmissive flat display panel having said plurality of pixels,
a first microlens array having a plurality of microlenses each having an optical axis which corresponds to a respective optical axis of one of said plurality of pixels,
a condenser lens, and
light source means having a minute light-emitting part, said light source means including a surface illuminant, and a pinhole stop for passing beams of light from said surface illuminant,
wherein beams of light emitted from said light source means are converged on said plurality of pixels of said transmissive display panel by said condenser lens and said first microlens array; and
optical means for converting beams of light emerging from said plurality of pixels into a plurality of approximately parallel beams of light, and for refracting said plurality of approximately parallel beams of light directly toward a pupil of an observer's eye, said optical means including:
first optical means for at least partially collimating said beams of light emerging from said plurality of pixels into a plurality of at least partially collimated diverging beams of light, said first optical means being a diffraction optical element array having a plurality of diffraction optical elements each having an optical axis which corresponds to a respective optical axis of one of said plurality of pixels of said image display means, each of said plurality of diffraction optical elements being disposed to overlap at least one of said plurality of diffraction optical elements adjacent thereto, and
second optical means for converting said plurality of at least partially collimated diverging beams of light emerging from said first optical means into said plurality of approximately parallel beams of light and refracting said plurality of approximately parallel beams of light toward said observer's eye.

11. An image display apparatus comprising:
image display means having a plurality of pixels arranged in a two-dimensional array, said image display means comprising:

a transmissive flat display panel having said plurality of pixels, a first microlens array having a plurality of microlenses each having an optical axis which corresponds to a respective optical axis of one of said plurality of pixels, a condenser lens, and light source means having a minute light-emitting part, said light source means including a surface illuminant, and a pinhole stop for passing beams of light from said surface illuminant, wherein beams of light emitted from said light source means are converged on said plurality of pixels of said transmissive display panel by said condenser lens and said first microlens array; and optical means for converting beams of light emerging from said plurality of pixels into a plurality of approximately parallel beams of light, and for refracting said plurality of approximately parallel beams of light directly toward a pupil of an observer's eye, said optical means being a diffraction optical element array having a plurality of diffraction optical elements each having an optical axis which corresponds to a respective optical axis of one of said plurality of pixels of said image display means, each of said diffraction optical elements being disposed to overlap at least one of said plurality of diffraction optical elements adjacent thereto.

* * * * *